United States Patent
Otte et al.

(10) Patent No.: US 8,421,934 B2
(45) Date of Patent: Apr. 16, 2013

(54) METHOD FOR ORIENTING AN OPTICAL ELEMENT ON A SCREEN

(75) Inventors: Stephan Otte, Jena (DE); Jens Meichsner, Weimar (DE)

(73) Assignee: VisuMotion GmbH, Jena (DE)

( * ) Notice: Subject to any disclaimer, the term of this patent is extended or adjusted under 35 U.S.C. 154(b) by 558 days.

(21) Appl. No.: 12/663,250

(22) PCT Filed: Jun. 2, 2008

(86) PCT No.: PCT/DE2008/000925
§ 371 (c)(1),
(2), (4) Date: Dec. 4, 2009

(87) PCT Pub. No.: WO2008/148378
PCT Pub. Date: Dec. 11, 2008

(65) Prior Publication Data
US 2010/0220325 A1    Sep. 2, 2010

(30) Foreign Application Priority Data
Jun. 7, 2007   (DE) .................... 10 2007 026 628

(51) Int. Cl.
*G02F 1/1335* (2006.01)
(52) U.S. Cl.
USPC .............. 349/15; 349/187; 356/400; 356/12; 359/462
(58) Field of Classification Search .............. 349/15, 349/187, 106; 356/614–616, 620, 622, 12, 356/6, 486, 490, 493, 498, 462, 400, 399, 356/401; 359/462, 463, 1
See application file for complete search history.

(56) References Cited

U.S. PATENT DOCUMENTS

| | | | | |
|---|---|---|---|---|
| 7,834,944 B2 * | 11/2010 | Otte et al. | ...................... | 349/15 |
| 2004/0008251 A1 | 1/2004 | Mashitani et al. | | |
| 2004/0263970 A1 * | 12/2004 | McKee, Jr. | .................... | 359/463 |
| 2006/0050382 A1 | 3/2006 | Jahrmarkt et al. | | |
| 2006/0051109 A1 | 3/2006 | Lim et al. | | |

FOREIGN PATENT DOCUMENTS

| | | |
|---|---|---|
| DE | 10003326 C2 | 8/2001 |
| DE | 10252830 B3 | 5/2004 |
| GB | 190418672 A | 0/1904 |
| JP | 08331605 A | 12/1996 |
| WO | WO 2004/077839 A1 | 9/2004 |

OTHER PUBLICATIONS

Kaplan, Sam H.; "Theory of Parallax Barriers"; The Journal of the SMPTE Jul. 1952; 59:11-21.

* cited by examiner

*Primary Examiner* — Thoi Duong
(74) *Attorney, Agent, or Firm* — Duane Morris LLP (57) ABSTRACT

The invention relates to a method for orienting an optical element (e. g. a parallax barrier screen or lenticular screen) on a screen comprising pixels x(i, j) in a raster composed of lines (i) and columns (j) in order to produce a screen for three-dimensional representation. In said method, especially a test pattern is presented which consists of various views A(k), wherein k=1, . . . , n, and n>1. The test pattern comprises at least two first straight lines that are located in different horizontal positions in the n>1 views A(k) as well as at least two second straight lines which each extend parallel to one of the first straight lines and are located in at least the same horizontal positions in the n>1 views A(k). The method according to the invention can be carried out quickly and with high accuracy and is therefore suitable for industrial use to produce screens for three-dimensional representation.

20 Claims, 5 Drawing Sheets

|   | j= | | | | | | | | | | | | | | | |
|---|---|---|---|---|---|---|---|---|---|---|---|---|---|---|---|---|
|   | 1 | 2 | 3 | 4 | 5 | 6 | 7 | 8 | 9 | 10 | 11 | 12 | 13 | 14 | 15 | 16 |
|   | R | G | B | R | G | B | R | G | B | R | G | B | R | G | B | R |
| i= 1 | 1 | 2 | 3 | 3 | 4 | 5 | 6 | 6 | 1 | 2 | 3 | 3 | 4 | 5 | 6 | 6 |
| 2 | 2 | 3 | 4 | 4 | 5 | 6 | 1 | 1 | 2 | 3 | 4 | 4 | 5 | 6 | 1 | 1 |
| 3 | 3 | 4 | 5 | 5 | 6 | 1 | 2 | 2 | 3 | 4 | 5 | 5 | 6 | 1 | 2 | 2 |
| 4 | 4 | 5 | 6 | 6 | 1 | 2 | 3 | 3 | 4 | 5 | 6 | 6 | 1 | 2 | 3 | 3 |
| 5 | 5 | 6 | 1 | 1 | 2 | 3 | 4 | 4 | 5 | 6 | 1 | 1 | 2 | 3 | 4 | 4 |
| 6 | 6 | 1 | 2 | 2 | 3 | 4 | 5 | 5 | 6 | 1 | 2 | 2 | 3 | 4 | 5 | 5 |
| 7 | 1 | 2 | 3 | 3 | 4 | 5 | 6 | 6 | 1 | 2 | 3 | 3 | 4 | 5 | 6 | 6 |
| 8 | 2 | 3 | 4 | 4 | 5 | 6 | 1 | 1 | 2 | 3 | 4 | 4 | 5 | 6 | 1 | 1 |
| 9 | 3 | 4 | 5 | 5 | 6 | 1 | 2 | 2 | 3 | 4 | 5 | 5 | 6 | 1 | 2 | 2 |
| 10 | 4 | 5 | 6 | 6 | 1 | 2 | 3 | 3 | 4 | 5 | 6 | 6 | 1 | 2 | 3 | 3 |
| 11 | 5 | 6 | 1 | 1 | 2 | 3 | 4 | 4 | 5 | 6 | 1 | 1 | 2 | 3 | 4 | 4 |
| 12 | 6 | 1 | 2 | 2 | 3 | 4 | 5 | 5 | 6 | 1 | 2 | 2 | 3 | 4 | 5 | 5 |

METHOD FOR ORIENTING AN OPTICAL ELEMENT ON A SCREEN

RELATED APPLICATIONS

The present application is a U.S. National Stage application of International PCT Application No. PCT/DE2008/000925 filed on Jun. 2, 2008 which claims priority benefit of German Application No. DE 10 2007 026 628.8 filed on Jun. 7, 2007, the contents of each are incorporated by reference in their entirety.

FIELD OF THE INVENTION

The invention relates to a method for aligning an optical element on a display screen, especially for creating a display screen for three-dimensional display.

BACKGROUND OF THE INVENTION

Approaches to the field of optical elements for three-dimensional display, especially with such optical elements configured as parallax barriers, have been existing for quite some time. Frederic Ives, a pioneer in this field, presented a system with a "line screen" for 3D display in GB 190418672 A. The article "Theory of parallax barriers" by Sam H. Kaplan, Journal of SMPTE Vol. 59, No 7, pp 11-21, July 1952, describes fundamental findings about the use of barrier screens for 3D display.

Attempts to gain autostereoscopic systems widespread use were unsuccessful for a long time, though. It was not until the 1980s that the computing power and novel display technologies then available made possible some renaissance of 3D systems. In the 1990s, the number of patent applications for, and publications on, 3D visualizations without stereo goggles soared. Outstanding results were achieved by the following inventors or suppliers:

PRIOR ART

In JP 08331605 AA, Masutani Takeshi et al. describe a stepped barrier, in which a transparent barrier element has approximately the size of a color subpixel (R, G or B). This technology made it possible for the first time to partially divert to the vertical direction the horizontal resolution loss occurring in most autostereoscopic systems due to the simultaneous display of several (at least two, preferably more than two) views. The disadvantage, here just as with all barrier methods, is the high light loss. Also, as the viewer moves sideways, the stereo contrast changes from almost 100% to about 50% and then again increases to 100%, which leads to a fluctuating 3D image quality in the viewing space.

With DE 100 03 326 C2, Armin Grasnick et al. succeeded in advancing the barrier technology with regard to two-dimensionally structured, wavelength-selective filter arrays for creating a 3D impression. This solution also suffers from the greatly impaired brightness of such 3D systems compared to a 2D display.

Wolfgang Tzschoppe et al. filed WO 2004/077839 A1, which relates to a barrier technology with improved brightness. Based on the stepped barrier approach of JP 08331605 AA and DE 100 03 326 C2, a special pulse duty ratio between the transparent and opaque barrier filter elements is described that is greater than 1/n, with n denoting the number of the views displayed. The configurations and teachings disclosed in that document, however, as a rule produce unpleasant moiré effects and/or a greatly restricted depth perception, as the stereo contrast is greatly impaired, compared with the teachings of JP 08331605 AA, for example.

US 2006/0051109 A1 (Lim et al.) describe the production of a 3D display screen, in which a 3D image generating device (e.g., a lens or a barrier screen) is aligned in front of a display screen and, once the alignment is correct, an adhesive-bonded joint is made to cure. For aligning, characteristically a black line is shown and observed by an operator or a camera. It is particularly disadvantageous here that alignment with merely one black line or black area will not necessarily result in the correctness required. The other methods suggested, namely, using at least one left and one right image with differing image contents (one fully white and one fully black area) as alignment test pattern, require the analysis of two disjoint partial images, i.e. the left and the right one.

DE 102 52 830 B3 (Maly-Motta) describes an autostereoscopic adapter (especially in the form of a lenticular screen) for a flat-panel display, which adapter is automatically calibrated via an electro-optical sensor. No information is given about the test patterns to be used for this, so that no statement can be made about the quality of the final calibration.

OBJECTS OF THE INVENTION

The invention relates to the problem of providing a way to align an optical element on a display screen for generating a display screen for three-dimensional display by the simplest possible means, so that sufficiently exact alignment is achieved within a short time.

According to the invention, this problem is solved by a method for aligning an optical element on a display screen with pixels $x(i,j)$ in a grid of rows (i) and columns (j) for producing a display screen for three-dimensional display, comprising the following steps:

presentation of a test pattern consisting of different views $A(k)$ with $k=1, \ldots, n$ and $n>1$, on the pixels $x(i,j)$ with rows (i) and columns (j), the test pattern comprising at least two first straight lines, and at least two of these lines being arranged in different horizontal positions in the n views $A(k)$ each, and with the test pattern comprising at least two second straight lines, which are each aligned in parallel with one of the first straight lines and which are arranged each in at least the same horizontal positions in the n views $A(k)$, observation of the test pattern thus presented through the optical element from a defined distance by means of a two-dimensional camera, alignment of the optical element in front of the display screen in such a way that, in the image of the test pattern recorded by the camera, each first straight line seamlessly merges into at least one appropriately arranged second straight line, and that all first and second straight lines show up in the image straight and without breaks, so that the alignment of the optical element relative to the display screen with pixels $x(i,j)$ is, with regard to the rotatory position of the optical element relative to the display screen, exactly defined with a tolerance of maximally 3 minutes of arc, and so that the alignment of the optical element relative to the display screen with pixels $x(i,j)$ is, with regard to the horizontal position of the optical element relative to the display screen, exactly defined with a tolerance of maximally the width of a pixel $x(i,j)$.

Advantageously, the optical element is designed as a parallax barrier screen, as a lenticular screen, as an active or passive holographic-optical element (HOE), as a lens array or as a prism array.

Preferably the method is configured in such a way that the test pattern comprises at least two first straight lines, which have two different directions of extension, and that at least some of these lines in the n>1 views A(k) are arranged in different horizontal positions, and that the test pattern comprises at least two second straight lines, which are each aligned in parallel with one of the first straight lines and which, in the n>1 views A(k), are arranged in at least the same horizontal positions each. This also enables alignment with regard to the vertical position of the optical element relative to the display screen.

Besides, not all first straight lines, especially if there are more than two of them, need to have disjoint directions of extension in pairs. It is sufficient if the entire group of first straight lines has at least two directions of extension. The same applies to the second straight lines, resulting from the fact that these are arranged in parallel with the first straight lines.

Moreover, the method permits the best possible alignment of the optical element relative to the display screen with regard to all three possible rotatory relative positions, i.e. all three axes of rotation in the three-dimensional space. This is of particular advantage if the optical element is attached only temporarily, as then the technical outlay for temporary or repeated correct aligning operations is kept low, because errors in alignment can easily be discovered and corrected.

Of course, alignment of the optical element with regard to the horizontal (and possibly vertical) relative position with the tolerance defined above is achieved only within recurrent periods, which are, as a rule, say, integral multiples of the width or height of a pixel $x(i,j)$, the respective integral multiple being defined by the horizontal or vertical periodicity of the views A(k) provided in the test pattern.

The step of alignment can, in principle, be carried out by an operator or automatically by a robot, or even in a mixed mode by an operator and a robot.

The index i addresses the rows and the index j addresses the columns on the grid of pixels $x(i,j)$.

The number of n>1, for example 2, 3, 4, 5, 6, 7, 8, 9 or 16 views in the test pattern firstly permits an efficient generation of the test pattern and secondly creates a sufficiently good test effect for achieving correct alignment.

The parameters for the optical element can, in case of a parallax barrier screen, be easily computed, e.g. with the aid of the two equations (1) and (2) known from Kaplan's article mentioned at the beginning. This establishes all necessary relations between the distance s between the grid of pixels $x(i,j)$ and the optical element, the average human interpupillary distance (here assumed to be 65 mm, for example), the viewing distance, the (horizontal) period length of the transparent segments of the barrier, and the stripe width of the said transparent segments. Some of the publications mentioned at the beginning provide further advice on configuration regarding optical elements such as lenticular screens, which are sufficiently known to those skilled in the art.

In the method invented, advantageously exactly two directions of extension of the first, and consequently also the second, straight lines are provided, which are arranged normal to each other. Further it is of advantage if the—without loss of generality—first direction of extension of the first straight lines is arranged in the direction of the rows (i) of pixels $x(i,j)$ and the second direction of extension of the first straight lines is arranged in the direction of the columns (j) of pixels $x(i,j)$. In practice it has proved useful to use at least one horizontal first straight line and at least five vertical lines in the test pattern.

Moreover it is reasonable to design the test pattern in such a way that in at least one of the n>1 views A(k) each first straight line seamlessly merges with exactly one second straight line.

In addition, at least one of the n>1 views A(k) may contain four right angles, which are arranged in such a way that a cross-shaped segment is formed. Then, after the step of alignment of the optical element in front of the display screen, at least one first straight line of the first direction of extension and at least one more first straight line of the second direction of extension should be located within the cross-shaped segment formed by the four right angles in the image of the test pattern recorded by the camera, and the distances of these lines from the respective nearest-neighbor right angles should be essentially equal. With this configuration, the correctness of alignment is further increased.

In most but not necessarily all cases, the image of the presented test pattern recorded by the camera after alignment will contain at least 40% pixels of exactly one of the n>1 views A(k).

Preferably, all first straight lines are of one and the same color, and all second straight lines also are of one color, with the color of the first straight lines preferably differing from that of the second straight lines.

To make the invented method still more favorable for industrial use, at least one—preferably all—of the n>1 views A(k) contains alphanumeric characters, preferably model or serial numbers and/or identifying markers/objects. This ensures that, for a particular display screen model, the proper test pattern is used, for example if the test pattern shows the model number, which the operator or robot always compares with the display screen currently worked on.

In another step after the alignment of the optical element, the image of the test pattern recorded by the camera can be saved, preferably with unambiguous assignment to the physical display screen and/or the optical element aligned on it, e.g., by giving the image file for the image to be saved a file name that shows the serial number of the display screen. This will make it possible later to prove beyond doubt that a particular display screen has been properly converted in to a 3D screen by fitting or aligning the optical element.

Furthermore, the pixels $x(i,j)$ each correspond to single color subpixels (R, G or B) or clusters of color subpixels (e.g., RG, GB or RGBR or others) or full-color pixels, the term full-color pixels meaning both white-mixing structures of RGB color subpixels, i.e. RGB triplets, and—depending on the image generation technology—actual full-color pixels, as frequently used, say, in projection screens.

In principle, the optical element can, after alignment in front of the display screen, be permanently mounted to the display screen at a defined distance s. This would be a permanent conversion.

In an alternative way, though, rather than mounting the optical element to the display screen after the step of alignment, one may, in another step, provide marks on the optical element and/or on the display screen which permit the optical element to be mounted to the display screen in an aligned position at a later time without the need to repeat the entire invented method at that later time.

The display screen may preferably be a color LCD display screen, a plasma display, a projection screen, an LED-based display screen, an OLED-based display screen, an SED display screen or a VFD display screen.

In case a parallax barrier screen is used as an optical element, this comprises transparent and opaque segments inclined relative to the vertical by an angle of inclination a.

The parallax barrier screen consists of a glass substrate on which the barrier structure is applied (e.g. on the rear side).

The barrier structure may be, e.g., an exposed and developed photographic film laminated to the rear surface of the glass substrate, with the emulsion layer of the photographic film preferably facing away from the glass substrate.

Alternatively the opaque areas of the barrier structure may be formed by ink printed onto the glass substrate. The transparent areas are created by omitting the ink in the appropriate areas.

Other manufacturing methods are known in prior art and need not be explained here.

In the invented method, the bits of partial image information of different views A(k) are arranged in the test pattern on the grid of pixels x(i,j) favorably in a two-dimensional periodic pattern, the period length in the horizontal and vertical directions preferably comprising no more than 32 pixels x(i,j) each. Exceptions from this upper limit of 32 pixels x(i,j) each are permissible.

As a rule, the angle that constitutes the said horizontal and vertical period length of the said two-dimensional periodic pattern as opposite leg and adjacent leg should essentially correspond to the angle of inclination a of the transparent segments on a parallax barrier screen, or of the cylindrical lenses on a lenticular screen, relative to the vertical.

Favorably the optical element is provided with means for reducing extraneous light reflections, preferably at least one interference-optical layer of antireflective coating.

In the later 3D display on the display screen with the aligned optical element, the views A(k) preferably correspond to different perspectives of a scene or object, just as with various other 3D display methods.

BRIEF DESCRIPTION OF THE DRAWINGS

Below, the invention will be explained in more detail in exemplary embodiments and with reference to the accompanying drawings in which.

None of the drawing is made to scale. This also, and in particular, applies to angular dimensions.

DESCRIPTION OF THE EMBODIMENTS

Figure 1:
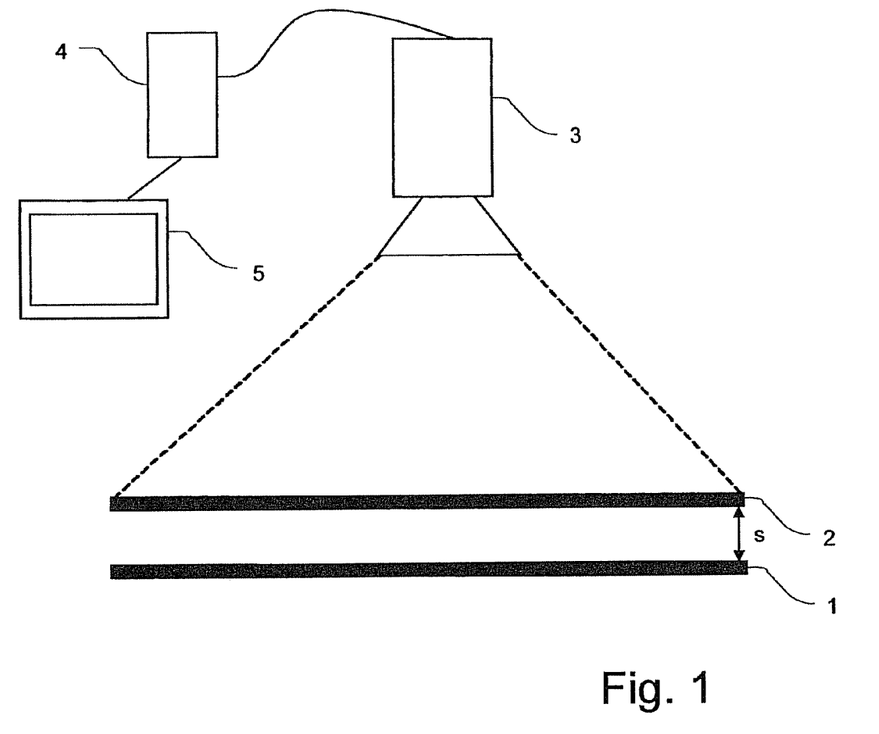
FIG. 1 shows the schematic setup for implementing the invented method.

FIG. 1 shows the schematic setup for implementing the invented method. The optical element 2 (here, for example, a parallax barrier screen) is aligned on a display screen 1 with pixels x(i,j) in a grid of rows i and columns j at a distance s, which makes up a display screen for three-dimensional display. The drawing further shows a (generally two-dimensional) camera 3, the output signal of which is fed (here, for example, by means of a frame grabber card) to a PC 4, which converts the signal and displays it on a monitor 5.

According to the invention, the following steps are carried out:
presentation of a test pattern consisting of different views A(k) with k=1, . . . , n and n>1, on the pixels x(i,j) with rows (i) and columns (j), the test pattern comprising at least two first straight lines 6a, 6b and with at least two of these lines 6a, 6b arranged in different horizontal positions in the n views A(k) each, and with the test pattern comprising at least two second straight lines 7a, 7b, which are each aligned in parallel with one of the first straight lines 6a, 6b and which are each arranged in at least the same horizontal positions in the n views A(k), observation of the test pattern thus presented through the optical element 2 from a defined distance by means of a two-dimensional camera 3, alignment of the optical element 2 in front of the display screen 1 in such a way that, in the image of the test pattern recorded by the camera 3, each first straight line 6a, 6b seamlessly merges into at least one appropriately arranged second straight line 7a, 7b, and that all first and second straight lines 6a, 6b, 7a, 7b show up in the image straight and without breaks, so that the alignment of the optical element 2 relative to the display screen 1 with pixels x(i,j) is, with regard to the rotatory position of the optical element 2 relative to the display screen 1, exactly defined with a tolerance of maximally 3 minutes of arc, and so that the alignment of the optical element 2 relative to the display screen 1 with pixels x(i,j) is, with regard to the horizontal position of the optical element 2 relative to the display screen 1, exactly defined with a tolerance of maximally the width of a pixel x(i,j).

In the embodiment shown here, the test pattern comprises at least two first straight lines 6a, 6b, which have two different directions of extension, with at least some of these lines 6a, 6b being arranged in different horizontal positions in the n>1 views A(k); the test pattern further comprises at least two second straight lines 7a, 7b, each of which is aligned in parallel with one of the first straight lines 6a, 6b and which are arranged in at least the same horizontal positions in the n>1 views A(k).

The step of alignment is carried out, e.g., by an operator.

The camera 3 is preferably arranged at a distance in front of the optical element 2, that distance corresponding to a selected 3D viewing distance in front of the display screen 1. As known to experts, this viewing distance is defined, as a rule, by the distance s between display screen 1 and optical element 2 in conjunction with further parameters, specified, e.g., in Kaplan's publication cited at the beginning. Preferably, the camera 3 is arranged in an optically normal position in front of the centre of the area of the display screen 1.

Figure 2:
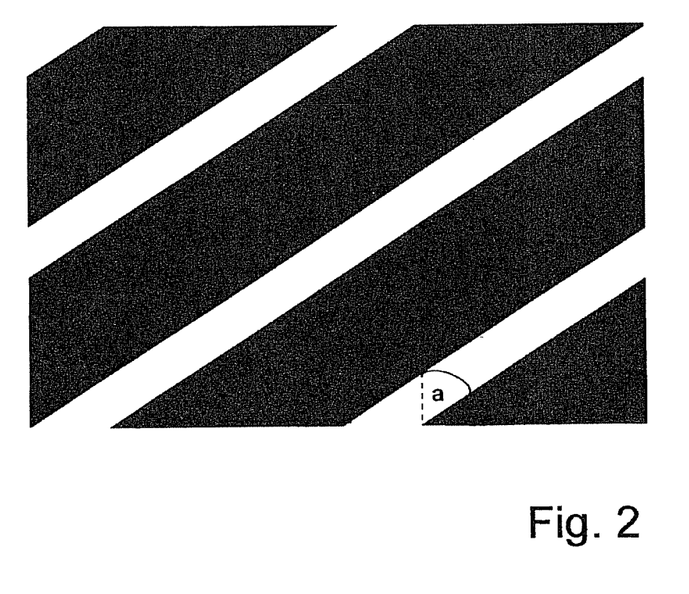
FIG. 2 is an example of a barrier structure in case a parallax barrier screen is used as an optical element in the invented method.

FIG. 2 shows an example of a barrier structure of an optical element 2 for use in the invented method. The optical element 2, i.e. in this case the parallax barrier screen, comprises transparent and opaque segments which are inclined relative to the vertical by an angle of inclination a. The parallax barrier screen consists of a glass substrate, on the rear surface of which the barrier structure has been applied. Other configurations are possible, such as substrates not consisting of glass (e.g., some plastic material).

Here, the barrier structure is, for example, an exposed and developed photographic film laminated to the rear surface of the glass substrate, with the emulsion layer of the photographic film preferably facing away from the glass substrate.

Figure 3:
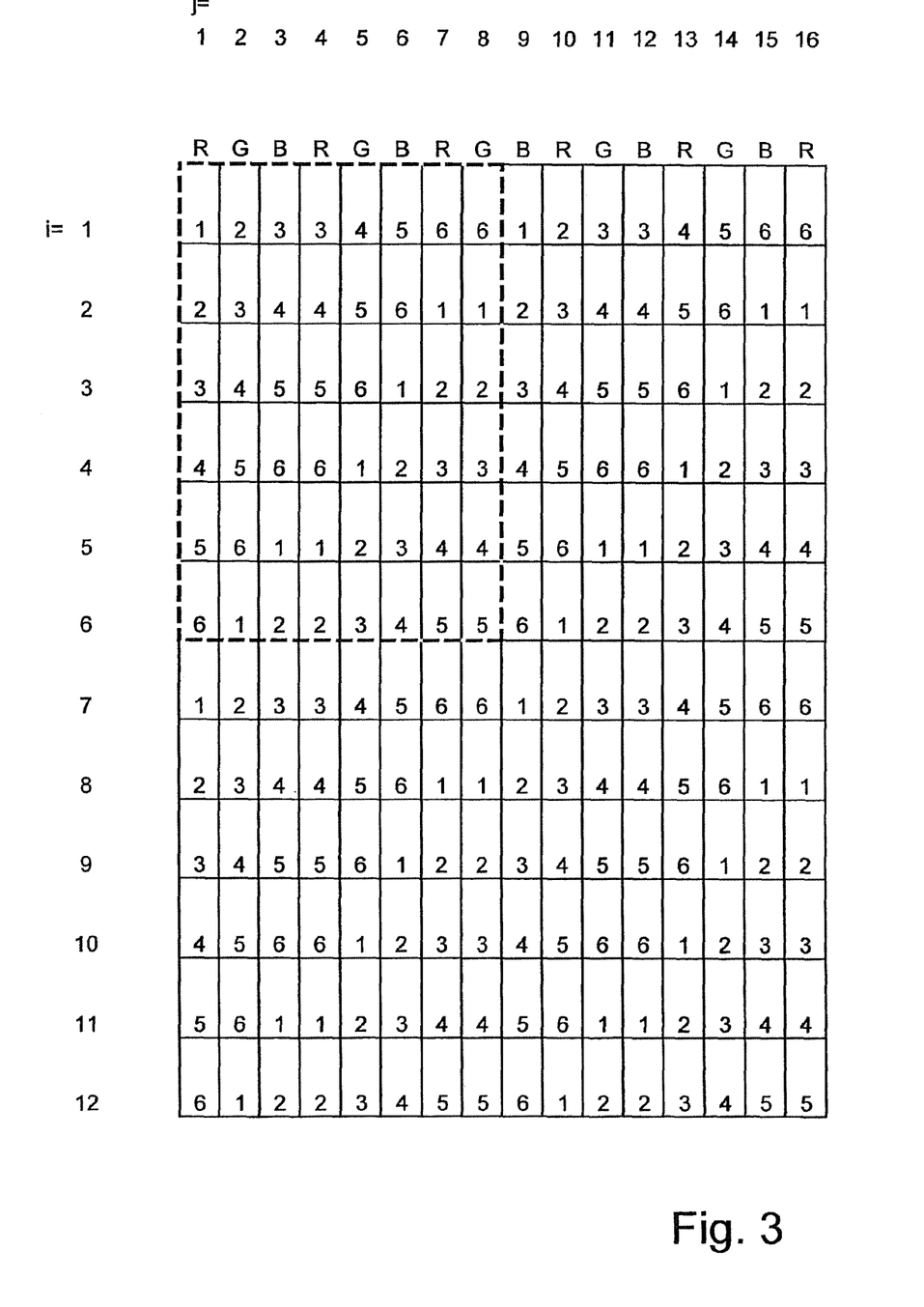
FIG. 3 is an example of an image combination of bits of partial image information of different views in the test pattern.

FIG. 3 illustrates an example of an image combination of the bits of partial image information of n=5 different views A(k) in the test pattern, which is displayed on the pixels x(i,j). In the invented method, the bits of partial image information of different views A(k) in the test pattern are arranged on the grid of pixels x(i,j) favorably in a two-dimensional periodic pattern.

As a rule, the angle that constitutes the said horizontal and vertical period length of the said two-dimensional periodic pattern as opposite leg and adjacent leg should essentially correspond to the angle of inclination a of the transparent segments on a parallax screen, or of the cylindrical lenses on a lenticular screen, relative to the vertical.

Favorably the optical element 2 is provided with means for reducing extraneous light reflections, preferably with at least one interference-optical layer of antireflective coating.

Figure 4:
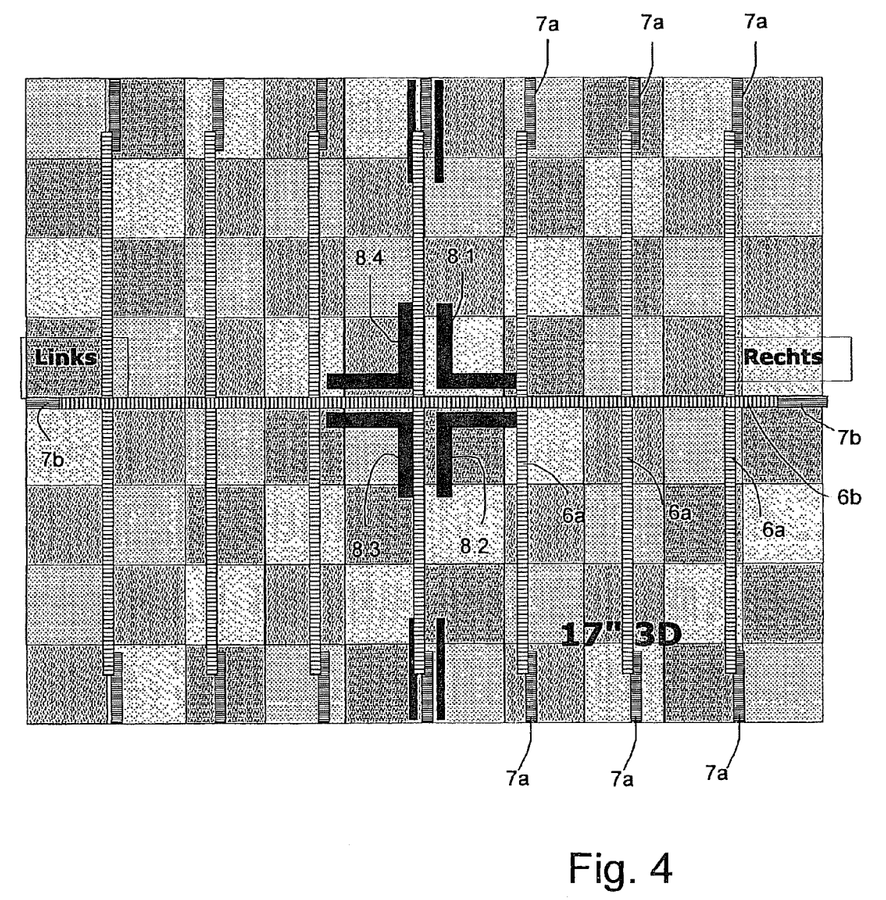
FIG. 4-FIG. 6 are viewing examples of individual views A(k), the bits of partial image information of which are displayed in the test pattern presented.
Figure 5:
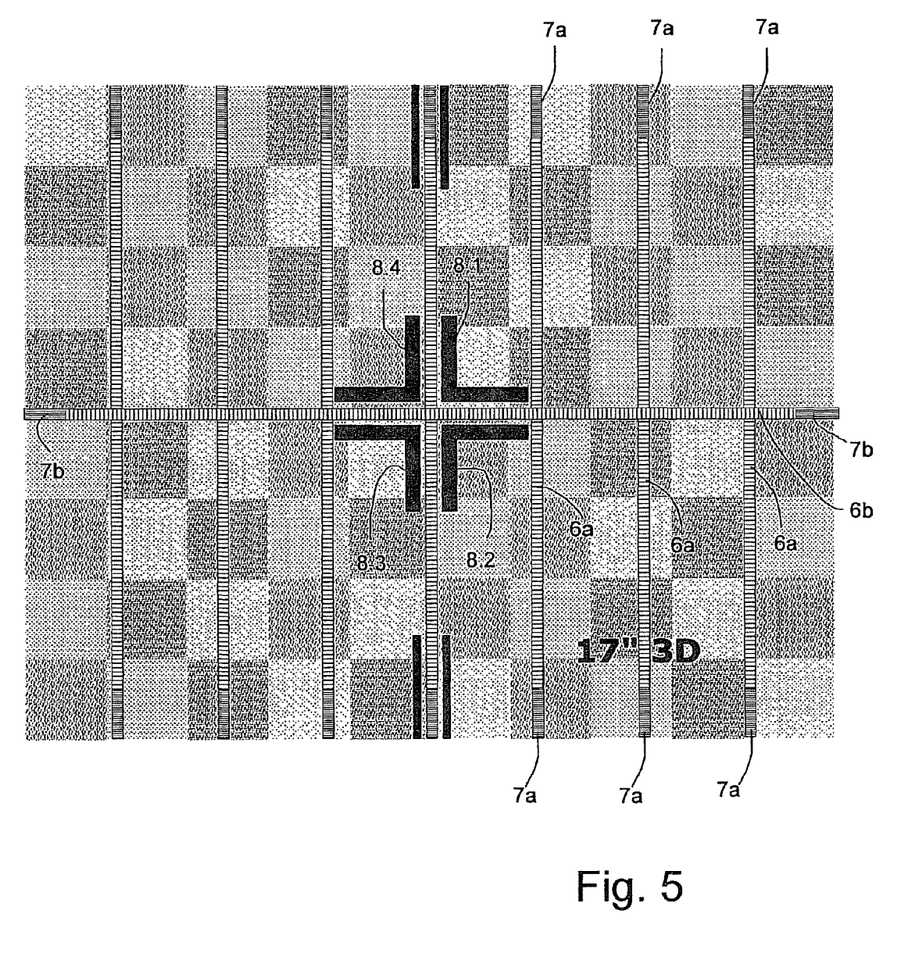
Figure 6:
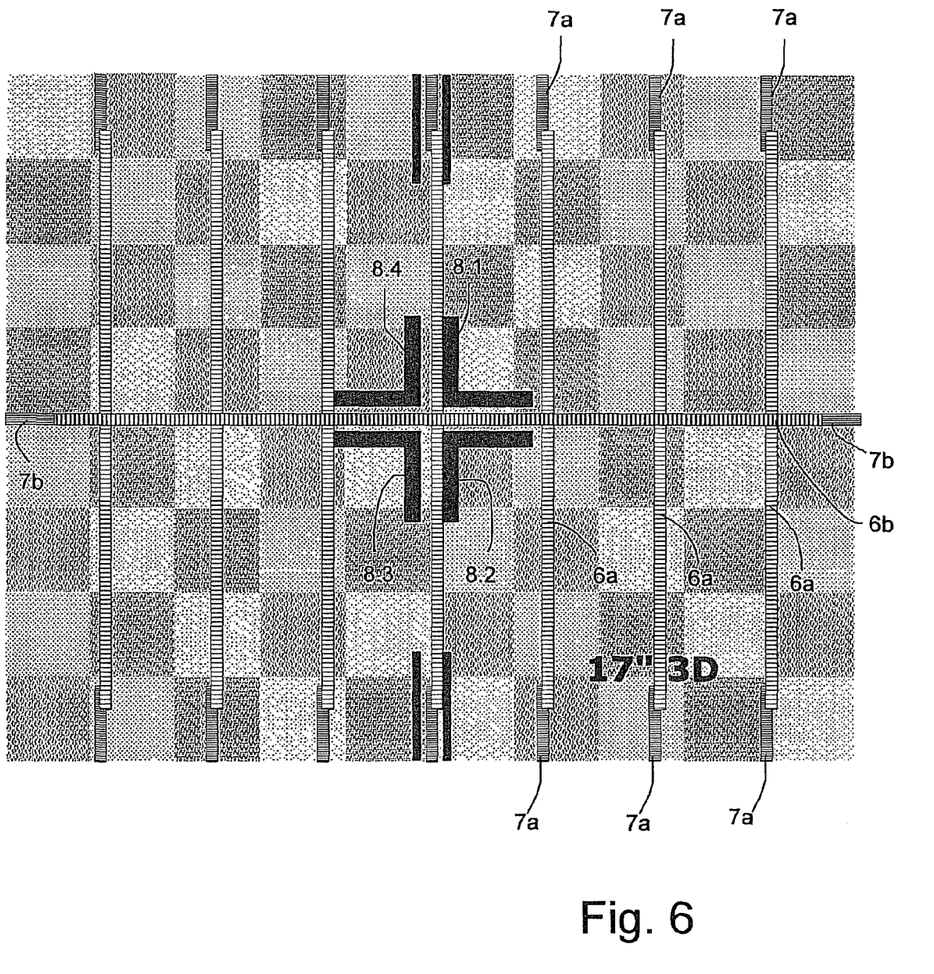

FIGS. 4 to 6 show viewing examples for individual views A(k) with k=1, k=3 and k=5, whose bits of partial image information are displayed in the test pattern presented.

The drawing shows at least two first straight lines 6a, 6b, which have two different directions of extension. These lines are each arranged in different horizontal positions in the n=5 views A(k). The test pattern further comprises at least two second straight lines 7a, 7b, each of which is arranged in parallel with one of the first straight lines 6a, 6b, and which are arranged in at least the same horizontal positions in the n=5 views A(k).

As can be seen in FIGS. 4 to 6, the first lines 6a and 6b are favorably arranged perpendicularly to each other. Further it is of advantage if the—without loss of generality—first straight lines 6b are arranged in the direction of the rows (i) of pixels x(i,j) and the first straight lines 6a are arranged in the direction of the columns (j) of pixels x(i,j). In practice it has proved useful to use at least one horizontal first straight line 6b and at least five vertical first straight lines 6b in the test pattern.

Moreover it is reasonable to design the test pattern in such a way that in at least one of the n>1 views A(k) each first straight line 6a, 6b seamlessly merges with exactly one or maximally two second straight lines 7a, 7b, here corresponding to FIG. 5.

In case that the optical element 2 (here: the parallax barrier screen) is arranged correctly in front of the display screen 1, the image of the presented test pattern recorded by the camera 3 should approximately look like view k=3 in FIG. 5. In case of incorrect alignment with regard to the rotatory position of the optical element 2 relative to the display screen 1, especially the first straight lines 6a, 6b do not appear neat, but broken or with serrated borders. This would indicate the need for continuing the alignment process by further rotatory change of the said relative position.

In case of incorrect alignment with regard to the horizontal and/or vertical position of the optical element 2 relative to the display screen 1, in no case all first straight lines 6a, 6b will merge seamlessly with the corresponding second straight lines 7a, 7b. This would indicate the need to move the optical element 2 horizontally and/or vertically in front of the display screen 1 to finally get to a correct position.

Moreover, as shown in FIGS. 4 to 6, in this example all of the n=5 views A(k) also contain four right angles 8.1, 8.2, 8.3 and 8.4, which are arranged to form a cross-shaped segment. After the step of alignment of the optical element 2 in front of the display screen 1, at least two first straight lines 6a, 6b should be located within the cross-shaped segment formed in the image of the test pattern recorded by the camera 3, and all first straight lines 6a, 6b should essentially be spaced at equal distances from the respective nearest-neighbor right angles (e.g., right angle 8.1, right angle 8.2 or right angle 8.4). With this configuration, the correctness of alignment of the optical element 2 in front of the display screen 1 is further increased.

Preferably, all first straight lines 6a, 6b are of one and the same color, and all second straight lines 7a, 7b also are of one color, with the color of the first straight lines 6a, 6b preferably differing from that of the second straight lines 7a, 7b. In the drawings, FIGS. 4 to 6, the colors are indicated by different patterns.

To make the invented method still more favorable for industrial use, at least one—preferably all—of the n>1 views A(k) contains alphanumeric characters, preferably model or serial numbers and/or identifying markers/objects. This ensures that, for a particular display screen model, the proper test pattern is used. In FIGS. 4 to 6, e.g., the inscription "17" 3D" can be seen.

In another step after the alignment of the optical element 2, the image of the test pattern recorded by the camera 3 can be saved, preferably with unambiguous assignment to the physical display screen 1 and/or the optical element 2 aligned on it, e.g., by giving the image file for the image to be saved a file name that shows the serial number of the display screen 1.

In the example embodiment, the parallax barrier screen (as an optical element 2) is permanently mounted, e.g., by adhesive joining or by screwing, to the display screen 1 by means of a spacer for maintaining the distance s defined above. The display screen 1 may preferably be a color LCD display screen.

In the later 3D display on the display screen 1 with the aligned optical element 2, the views A(k) correspond to different perspectives of a scene or object, just as with various other 3D display methods.

In a technically equivalent embodiment of the invented method, the optical element 2 is not arranged and aligned in front of, but in the display screen, i.e. (in viewing direction) behind a transmissive image generator, e.g. an LCD panel. This is of advantage especially if a parallax barrier screen located inside is replaced by an illumination barrier (e.g. by a structured LED illumination).

The advantages of the invention are many and varied. Especially, the invented method permits the alignment of an optical element, such as a parallax barrier screen or a lenticular screen, on a display screen for creating a display screen for three-dimensional display within a relatively short time and with high exactness. By means of suitable test patterns, the method is further applicable to display screens of different sizes and, thus, very flexible. Moreover, the said alignment can be implemented manually, automatically or semiautomatically.

The invention can be implemented by simple, commercially available means.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for aligning an optical element (2) on a display screen (1) with pixels x(i,j) in a grid of rows (i) and columns (j) for creating a display screen for three-dimensional display, comprising the following steps:

presenting a test pattern consisting of different views A(k) with k=1, . . . , n and n>1, wherein n<6 or n>7, on the pixels x(i,j) with rows (i) and columns (j), the test pattern comprising at least two first straight lines (6a, 6b) and at least two of these lines (6a, 6b) being arranged in different horizontal positions in the n views A(k) each, and with the test pattern comprising at least two second straight lines (7a, 7b) each of which is aligned in parallel with one of the first straight lines (6a, 6b) and each of which is arranged in at least the same horizontal positions in the n views A(k);

observing the presented test pattern through the optical element (2) from a defined distance by means of a two-dimensional camera (3);

aligning the optical element (2) in front of the display screen (1) in such a way that, in an image which is recorded by the camera (3) of the presented test pattern each first straight line (6a, 6b) seamlessly merges into at least one appropriately arranged second straight line (7a, 7b), and that all first and second straight lines (6a, 6b, 7a, 7b) are displayed in said image straight and without breaks;

wherein the alignment of the optical element (2) relative to the display screen (1) with pixels x(i,j) is, with regard to the rotatory position of the optical element (2) relative to the display screen (1), exactly defined with a tolerance of maximally 3 minutes of arc; and wherein the alignment of the optical element (2) relative to the display screen (1) with pixels x(i,j) is, with regard to the horizontal position of the optical element (2) relative to the display screen (1), exactly defined with a tolerance of maximally the width of a pixel x(i,j).

2. A method as claimed in claim 1, wherein the test pattern comprises at least two first straight lines (6a, 6b), which have two directions of extension different from each other, with at least two of these lines (6a, 6b) being arranged in different horizontal positions in the n views A(k), and in that the test pattern comprises at least two second straight lines (7a, 7b), each of which is aligned in parallel with one of the first straight lines (6a, 6b) and each of which is arranged in at least the same horizontal positions in the n views A(k).

3. A method as claimed in claim 2, wherein the at least two first lines (6a, 6b) are arranged normal to each other.

4. A method as claimed in claim 2, wherein the first straight lines (6b) are arranged in the direction of the rows (i) of pixels x(i,j) and the first straight lines (6a) are arranged in the direction of the columns (j) of pixels x(i,j).

5. A method as claimed in claim 1, wherein in at least one of the n views A(k) each first straight line (6a, 6b) seamlessly merges into maximally two second straight lines (7a, 7b).

6. A method as claimed in claim 3, wherein at least one of the n views A(k) contains four right angles, which form, by their arrangement, a cross-shaped segment, and in that, after the step of alignment of the optical element (2) in front of the display screen (1), at least two first straight lines (6a, 6b) are located within the cross-shaped segment in the image of the presented test pattern recorded by the camera (3), with the first straight lines (6a, 6b) run parallel to, and equidistant from, the respective adjacent legs of the right angles.

7. A method as claimed in claim 1, wherein after the alignment, the image recorded by the camera (3) of the presented test pattern contains at least 40% pixels of exactly one of the n views A(k).

8. A method as claimed in claim 1, wherein all first straight lines each (6a, 6b) and all second straight lines each (7a, 7b) are provided with the same color, with the color of the first straight lines (6a, 6b) preferably differing from that of the second straight lines (7a, 7b).

9. A method as claimed in claim 1, wherein at least one—preferably all—of the n views A(k) is provided with alphanumeric characters, such as model or serial numbers, and/or identifying markers/objects.

10. A method as claimed in claim 1, wherein after the alignment of the optical element (2), an added step of saving the image of the presented test pattern recorded by the camera (3) is carried out, with preferably an unambiguous assignment being made to the physical display screen (1) and/or the optical element (2) aligned on it, for example, by giving the image file for the said image to be saved a file name in the form of a serial number of the display screen (1).

11. A method as claimed in claim 1, wherein the pixels x(i,j) correspond to color subpixels (R, G or B) or clusters of color subpixels (e.g., RG or GB) or full-color pixels.

12. A method as claimed in claim 1, wherein the optical element (2), after the alignment in front of the display screen (1), is permanently mounted to the display screen (1) at a defined distance (s).

13. A method as claimed in claim 1, wherein the optical element (2), after the step of alignment, is not mounted to the display screen (1), but that, in an added step, marks are applied on the optical element (2) and/or on the display screen (1), which permit aligned mounting of the optical element (2) to the display screen (1) at a later time, without the need of repeating the entire invented method at that later time.

14. A method as claimed in claim 1, wherein the display screen (1) used is a color LCD display screen, a plasma display, a projection screen, an LED-based display screen, an OLED-based display screen, an SED display screen or a VFD display screen.

15. A method for aligning an optical element (2) on a display screen (1) with pixels x(i,j) in a grid of rows (i) and columns (j) for creating a display screen for three-dimensional display, comprising the following steps:

presenting a test pattern consisting of different views A(k) with k=1, . . . , n and n>1, on the pixels x(i,j) with rows (i) and columns (j), the test pattern comprising at least two first straight lines (6a, 6b) and at least two of these lines (6a, 6b) being arranged in different horizontal positions in the n views A(k) each, and with the test pattern comprising at least two second straight lines (7a, 7b) each of which is aligned in parallel with one of the first straight lines (6a, 6b) and each of which is arranged in at least the same horizontal positions in the n views A(k);

observing the presented test pattern through the optical element (2) from a defined distance by means of a two-dimensional camera (3);

aligning the optical element (2) in front of the display screen (1) in such a way that, in an image which is recorded by the camera (3) of the presented test pattern, each first straight line (6a, 6b) seamlessly merges into at least one appropriately arranged second straight line (7a, 7b), and that all first and second straight lines (6a, 6b, 7a, 7b) are displayed in said image straight and without breaks;

wherein the alignment of the optical element (2) relative to the display screen (1) with pixels x(i,j) is, with regard to the rotatory position of the optical element (2) relative to the display screen (1), exactly defined with a tolerance of maximally 3 minutes of arc;

wherein the alignment of the optical element (2) relative to the display screen (1) with pixels x(i,j) is, with regard to the horizontal position of the optical element (2) relative to the display screen (1), exactly defined with a tolerance of maximally the width of a pixel x(i,j); and wherein the optical element (2) is configured as a lenticular screen, as an active or passive holographic-optical element (HOE), as a lens array or as a prism array.

16. A method as claimed in claim 1, wherein the optical element (2) is configured as a parallax barrier screen which comprises transparent and opaque segments that are either stepped or inclined relative to the vertical by an angle (a).

17. A method as claimed in claim 16, wherein the optical element (2) configured as the parallax barrier screen consists of a glass substrate which is provided with a barrier structure.

18. A method as claimed in claim 17, wherein said barrier structure is an exposed and developed photographic film that is laminated to the rear surface of said glass substrate, with an emulsion layer, if any, of the photographic film preferably not facing said glass substrate.

19. A method as claimed in claim 17, wherein said barrier structure includes opaque areas which are formed by ink printed on said glass substrate.

20. A method as claimed in claim 1, wherein the optical element (2) comprises means for reducing extraneous light reflections, preferably at least one interference-optical layer of antireflective coating.

\* \* \* \* \*